US012169388B2

(12) United States Patent
Sakurai

(10) Patent No.: US 12,169,388 B2
(45) Date of Patent: Dec. 17, 2024

(54) IMAGE FORMING APPARATUS WITH A PARTICULARLY ARRANGED DUCT FOR SUPPLYING AIR

(71) Applicant: CANON KABUSHIKI KAISHA, Tokyo (JP)

(72) Inventor: Takanori Sakurai, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/343,818

(22) Filed: Jun. 29, 2023

(65) Prior Publication Data

US 2024/0004345 A1 Jan. 4, 2024

(30) Foreign Application Priority Data

Jul. 4, 2022 (JP) ................................ 2022-107600

(51) Int. Cl.
*G03G 21/20* (2006.01)
*G03G 15/00* (2006.01)
*G03G 15/20* (2006.01)

(52) U.S. Cl.
CPC ....... *G03G 21/206* (2013.01); *G03G 15/2017* (2013.01); *G03G 15/6573* (2013.01); *G03G 15/6579* (2013.01); *G03G 2215/0043* (2013.01); *G03G 2221/1645* (2013.01)

(58) Field of Classification Search
CPC ............. G03G 21/206; G03G 15/2017; G03G 2221/1645; G03G 15/20; G03G 15/6573; G03G 15/6579; G03G 15/2021; G03G 2215/0043
See application file for complete search history.

(56) References Cited

U.S. PATENT DOCUMENTS 8,086,131 B2 12/2011 Koshida
9,811,030 B2 11/2017 Masuda
2006/0133865 A1* 6/2006 Nakamura .......... G03G 21/206 399/320

(Continued)

FOREIGN PATENT DOCUMENTS

JP 2005089079 A 4/2005
JP 2006084694 A 3/2006

(Continued)

*Primary Examiner* — Arlene Heredia
*Assistant Examiner* — Laura Roth
(74) *Attorney, Agent, or Firm* — ROSSI, KIMMS & McDOWELL LLP

(57) ABSTRACT

An image forming apparatus includes a fixing portion, a conveyance path, a roller pair, and a duct. The roller pair includes a first roller and a second roller, the first roller and the second roller being configured to nip a sheet conveyed in the conveyance path to cool the sheet. The duct is provided to extend in a width direction orthogonal to a sheet conveyance direction. The duct includes a ventilation path forming portion and an opening portion continuous with the ventilation path forming portion and facing the conveyance path, the ventilation path forming portion being disposed to face a side of the roller pair opposite to a nip of the roller pair across a center line of the first roller and configured to form a ventilation path configured to allow air to pass therethrough between the first roller and the ventilation path forming portion.

10 Claims, 7 Drawing Sheets

(56) References Cited

U.S. PATENT DOCUMENTS

| | | | | |
|---|---|---|---|---|
| 2009/0202268 | A1* | 8/2009 | Furukawa | G03G 15/2064 399/92 |
| 2011/0081176 | A1* | 4/2011 | Masuda | B65H 29/125 399/341 |
| 2011/0222922 | A1* | 9/2011 | Kimata | G03G 15/2028 399/323 |
| 2012/0201564 | A1* | 8/2012 | Masuda | G03G 15/2017 399/92 |
| 2012/0301174 | A1* | 11/2012 | Masuda | G03G 15/6573 399/92 |
| 2015/0338796 | A1* | 11/2015 | Koga | G03G 21/206 399/341 |
| 2019/0250549 | A1* | 8/2019 | Zaitsu | G03G 15/6579 |
| 2020/0073298 | A1* | 3/2020 | Kokubo | G03G 15/2032 |
| 2020/0218181 | A1* | 7/2020 | Midorikawa | G03G 15/2021 |
| 2021/0034011 | A1* | 2/2021 | Ohta | G03G 21/206 |
| 2022/0091557 | A1* | 3/2022 | Sakurai | G03G 21/206 |

FOREIGN PATENT DOCUMENTS

| | | | |
|---|---|---|---|
| JP | 2007078984 | A | 3/2007 |
| JP | 2010266810 | A | 11/2010 |
| JP | 2011090170 | A | 5/2011 |
| JP | 2017010068 | A | 1/2017 |
| JP | 2020200186 | A | 12/2020 |
| JP | 2021043303 | A | 3/2021 |
| JP | 2022176689 | A * | 11/2022 |

* cited by examiner

IMAGE FORMING APPARATUS WITH A PARTICULARLY ARRANGED DUCT FOR SUPPLYING AIR

BACKGROUND OF THE INVENTION

Field of the Invention

The present invention relates to an image forming apparatus that forms an image on a sheet, such as a copier, a printer, a facsimile machine, or a multifunctional apparatus having functions of a plurality of these.

Description of the Related Art

Conventionally, in an image forming apparatus, after a toner image is transferred onto a sheet and is fixed by melt-fixation in a fixing unit, the sheet is discharged to the outside, or the front surface and back surface thereof are reversed to perform image formation on the back surface. However, there is a possibility that, after the toner image is fixed in the fixing unit, the sheet touches a guide or a roller to be partially cooled, and an image defect such as unevenness in the glossiness occurs. Further, if a large number of sheets having undergone image formation are stacked at high temperature, there is a possibility that a phenomenon in which toner on one sheet sticks to another sheet occurs. To solve this, Japanese Patent Laid-Open No. 2010-266810 proposes an image forming apparatus in which occurrence of an image defect and sticking of sheets is suppressed by disposing a cooling roller pair immediately after the fixing unit to sufficiently cool the sheet and toner heated by the fixing unit.

However, in the configuration described in Japanese Patent Laid-Open No. 2010-266810, in the case where duplex printing is performed successively, since sheets at high temperature constantly pass the cooling roller pair disposed immediately after the fixing unit, there is a possibility that the temperature of the cooling roller pair gradually increases. Further, if the temperature of the cooling roller pair increases, there is a possibility that a sufficient cooling effect cannot be obtained. To solve this, for example, a measure by increasing the size of the cooling roller pair and improving the cooling performance can be considered, but in this case, there is a possibility that this causes increase in the size or cost of the image forming apparatus.

An object of the present invention is to provide an image forming apparatus capable of improving the cooling performance for a sheet after fixation.

SUMMARY OF THE INVENTION

According to a first aspect of the present invention, an image forming apparatus includes a fixing portion configured to heat a toner image transferred onto a sheet and fix the toner image to the sheet, a conveyance path in which a sheet conveyed from the fixing portion is conveyed, a roller pair disposed in the conveyance path and including a first roller and a second roller, the first roller and the second roller being configured to nip a sheet conveyed in the conveyance path to cool the sheet, and a duct provided to extend in a width direction orthogonal to a sheet conveyance direction and configured to allow air to pass therethrough. The duct includes a ventilation path forming portion and an opening portion continuous with the ventilation path forming portion and facing the conveyance path, the ventilation path forming portion being disposed to face a side of the roller pair opposite to a nip of the roller pair across a center line of the first roller and configured to form a ventilation path configured to allow air to pass therethrough between the first roller and the ventilation path forming portion.

Further features of the present invention will become apparent from the following description of exemplary embodiments with reference to the attached drawings.

DESCRIPTION OF THE EMBODIMENTS

First Embodiment

A first embodiment of the present invention will be described in detail below with reference to FIGS. 1 to 6. In the present embodiment, a full-color printer of a tandem type is described as an example of an image forming apparatus 1. However, the present invention is not limited to the image forming apparatus 1 of a tandem type, and may be an image forming apparatus of a different type. In addition, the image forming apparatus is not limited to a full-color image forming apparatus, and may be a monochromatic image forming apparatus.

Image Forming Apparatus

Figure 1:
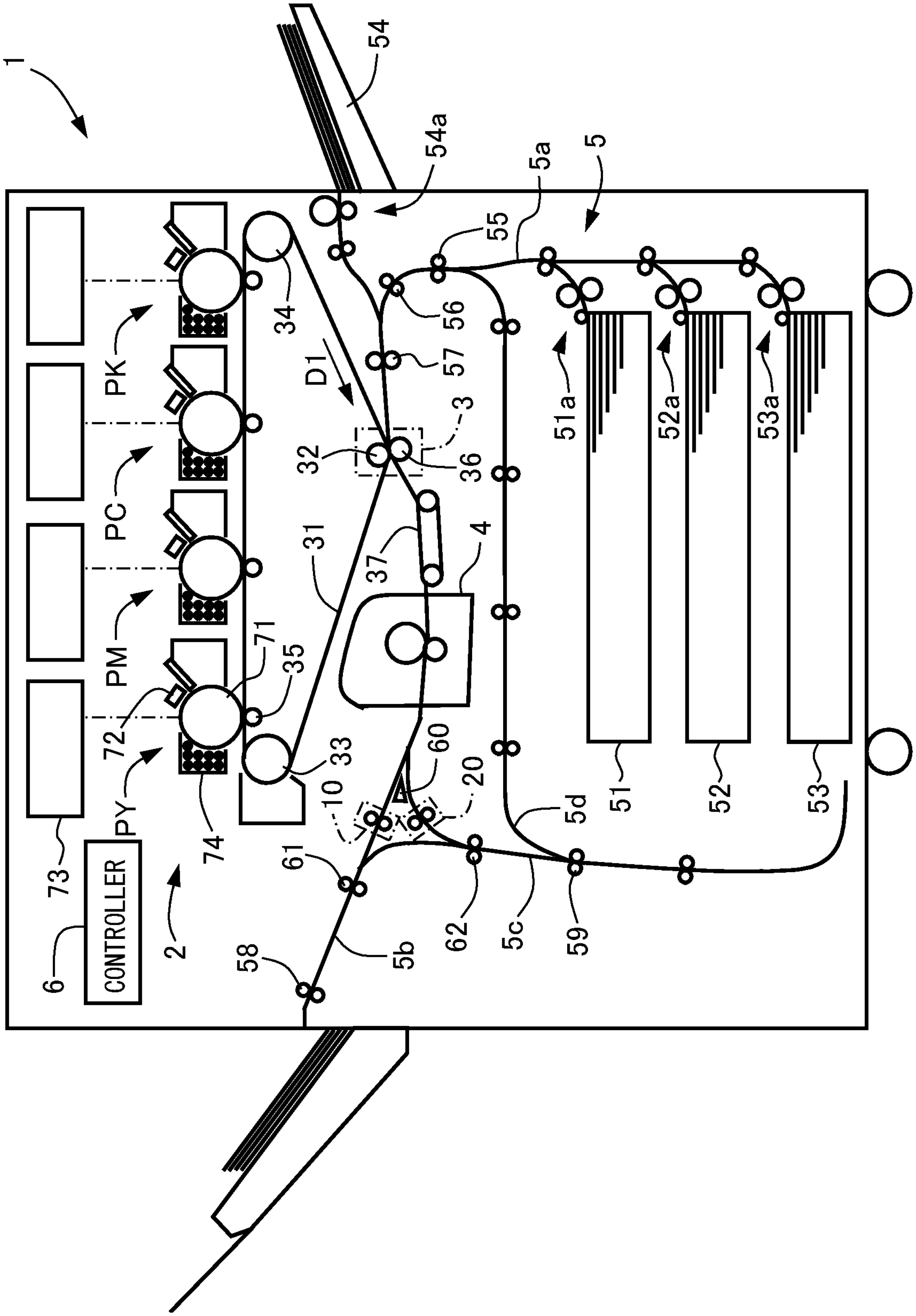
FIG. 1 is a section view of an image forming apparatus according to a first embodiment illustrating a schematic configuration thereof.

FIG. 1 is a schematic configuration diagram of the image forming apparatus 1 according to the present embodiment. The image forming apparatus 1 is mainly constituted by an image forming portion 2, a secondary transfer portion 3, a fixing unit 4, a sheet conveyance portion 5, and a controller 6.

The image forming portion 2 includes image forming units PY, PM, PC, and PK corresponding to respective colors of yellow (Y), magenta (M), cyan (C), and black (Bk). The image forming units PY, PM, PC, and PK have similar configurations, and therefore the image forming unit PY for yellow will be described with a reference sign as a representative. The image forming unit PY includes a photosensitive drum 71 that is a photosensitive member serving as an image bearing member, a charging unit 72, an exposing unit 73 serving as an image drawing portion, and a developing unit 74. In addition, the image forming portion 2 includes an intermediate transfer belt 31, a secondary transfer inner roller 32, a driving roller 33, a tension roller 34, and a primary transfer unit 35.

In the image forming portion 2, the surface of the photosensitive drum 71 is uniformly charged by the charging unit 72 in advance, and the exposing unit 73 is driven on the basis of a signal of image information to form a latent image on the surface of the photosensitive drum 71 that is rotating. The electrostatic latent image formed on the surface of the photosensitive drum 71 is visualized as a toner image through development with toner by the developing unit 74. Then, a predetermined pressurizing force and electrostatic bias are applied by the primary transfer unit 35, and thus the toner image is transferred onto the intermediate transfer belt 31.

The intermediate transfer belt 31 is stretched over rollers such as the driving roller 33, the tension roller 34, and the secondary transfer inner roller 32, and is driven in a direction D1 illustrated in FIG. 1 for conveyance. Image formation processes of respective colors in the image forming units PY, PM, PC, and PK that are performed in parallel are each performed at such a timing that the toner image thereof is superimposed on the toner image of an upstream color having been already transferred onto the intermediate transfer belt 31 through primary transfer. As a result, a full-color toner image is eventually formed on the intermediate transfer belt 31, and this toner image is conveyed to the secondary transfer portion 3.

A sheet S serving as a recording material or a transfer target material is supported and accommodated in or on a first sheet cassette 51, a second sheet cassette 52, a third sheet cassette 53, and a manual feed portion 54. The sheet S is fed by one of feeding portions 51*a*, 52*a*, 53*a*, and 54*a*, and is then guided by a supply path 5*a* of the sheet conveyance portion 5 to be conveyed to the image forming portion 2. The supply path 5*a* is formed by a conveyance roller pair 55, a pre-registration roller pair 56, a registration roller pair 57, and other unillustrated guide members. The sheet S fed by one of the feeding portions 51*a*, 52*a*, 53*a*, and 54*a* passes through the conveyance roller pair 55 and the pre-registration roller pair 56, and is conveyed to the registration roller pair 57.

The pre-registration roller pair 56 corrects the skew of the sheet S. Specifically, the leading end of the conveyed sheet S is caused to abut a nip portion of the registration roller pair 57 that is in a stationary state. In this manner, the pre-registration roller pair 56 causes the sheet S to form a loop to correct the skew. The registration roller pair 57 conveys the sheet S to the secondary transfer portion 3 at a timing matching the timing at which the toner image on the intermediate transfer belt 31 is transferred onto the sheet S.

The secondary transfer portion 3 includes a toner image transfer nip portion formed by the secondary transfer inner roller 32 and a secondary transfer outer roller 36 that oppose each other, and transfers the toner image onto the conveyed sheet S by applying a predetermined pressurizing force and electrostatic bias. The sheet S after transfer is conveyed to the fixing unit 4 by an air suction conveyance portion 37, and the toner image is melt-fixed to the sheet S by heating and pressurization. That is, the fixing unit 4 is an example of a fixing portion, and heats the toner image transferred onto the sheet S by the secondary transfer portion 3 to fix the toner image to the sheet S.

The controller 6 includes a central processing unit: CPU, and memories such as a read-only memory: ROM and a random access memory: RAM. The CPU obtains various data input by an operation portion, stores the data in a memory, and, for example, by activation operation such as switching the image forming apparatus 1 on by a user, can load a printing program from a memory and execute the printing program. The memory stores various programs and various data such as a printing program and an image formation job.

Conveyance Path Downstream of Fixing Unit

On the downstream side of the fixing unit 4 in a sheet conveyance direction, the sheet conveyance portion 5 includes a discharge path 5*b*, a reverse path 5*c*, a re-feeding path 5*d*, and a switching portion 60. The discharge path 5*b* is an example of a first conveyance path, is disposed downstream of the fixing unit 4 in the sheet conveyance direction, and is a path for discharging the sheet S conveyed from the fixing unit 4 to the outside of the apparatus. A conveyance roller pair 61 and a discharge roller pair 58 are provided in the discharge path 5*b*. The reverse path 5*c* is an example of a conveyance path and a second conveyance path, is provided to be branched from the discharge path 5*b*, and is a path for conveying the sheet S conveyed from the fixing unit 4 to a reverse roller pair 59 that reverses the conveyance direction. Here, in the reverse path 5*c*, not only the conveyance direction but also the front surface and back surface of the sheet S are reversed. A conveyance roller pair 62 and the reverse roller pair 59 are provided in the reverse path 5*c*. To be noted, the reverse path 5*c* is curved more than the discharge path 5*b*. The re-feeding path 5*d* is a path for conveying the sheet S whose conveyance direction and front and back surfaces are reversed by the reverse roller pair 59 to the secondary transfer portion 3 again, and is connected to the reverse path 5*c*. The switching portion 60 switches the path to which the sheet S conveyed from the fixing unit 4 between the discharge path 5*b* and the reverse path 5*c*. That is, the sheet S conveyed from the fixing unit 4 is selectively conveyed to the discharge path 5*b* and the reverse path 5*c*.

If a sheet passing mode of the sheet S is simplex face-up sheet passing, the conveyance path of the sheet S is switched to the discharge path 5*b* by the switching portion 60, and the sheet S on which a toner image has been melt-fixed by the fixing unit 4 is conveyed to the discharge path 5*b*. The sheet S is cooled by a first cooling roller pair 10 disposed in the discharge path 5*b*, and is then discharged to the outside of the apparatus by the discharge roller pair 58.

In the case where the sheet passing mode of the sheet S is duplex sheet passing, the conveyance path of the sheet S is switched to the reverse path 5*c* by the switching portion 60, and the sheet S to a first surface of which a toner image has been fixed by the fixing unit 4 is conveyed to the reverse path 5*c*. The sheet S is cooled by a second cooling roller pair 20 disposed in the reverse path 5*c*. The reverse roller pair 59 is rotated in a reverse direction after the sheet S cooled by the second cooling roller pair 20 is temporarily stopped in a state in which a part of the sheet S of a predetermined length from the trailing end thereof is at the reverse roller pair 59, thus the conveyance direction and front and back surfaces of the sheet S are reversed by the reverse roller pair 59, and the sheet S is conveyed to the re-feeding path 5*d*. That is, the reverse roller pair 59 is an example of a reverse portion that reverses and conveys the sheet conveyed in the first direction to a second direction opposite to the first direction.

The sheet S is conveyed to the secondary transfer portion 3 through the re-feeding path 5*d*, a toner image is transferred onto a second surface of the sheet S, and the toner image is fixed by the fixing unit 4. In addition, the conveyance path of the sheet S is switched to the discharge path 5*b* by the switching portion 60, and the sheet S to the second surface of which a toner image has been melt-fixed by the fixing unit 4 is conveyed to the discharge path 5*b*. The sheet S is cooled by the second cooling roller pair 70, and is then discharged to the outside of the apparatus by the discharge roller pair 58.

Next, the operation in the case of successively forming images on a plurality of sheets S will be described. In the case of simplex face-up sheet passing, the sheets S are subjected to image formation and discharged to the outside of the apparatus at a sheet passing interval T serving as a predetermined period. In contrast, in the case of duplex sheet passing, whereas the sheets S are subjected to image formation at the sheet passing interval T, since the image formation is alternately performed on the first surface side and the second surface side of the sheets S, the sheets S are discharged to the outside of the apparatus at an interval twice the sheet passing interval T.

Cooling Roller Pair

Figure 2:
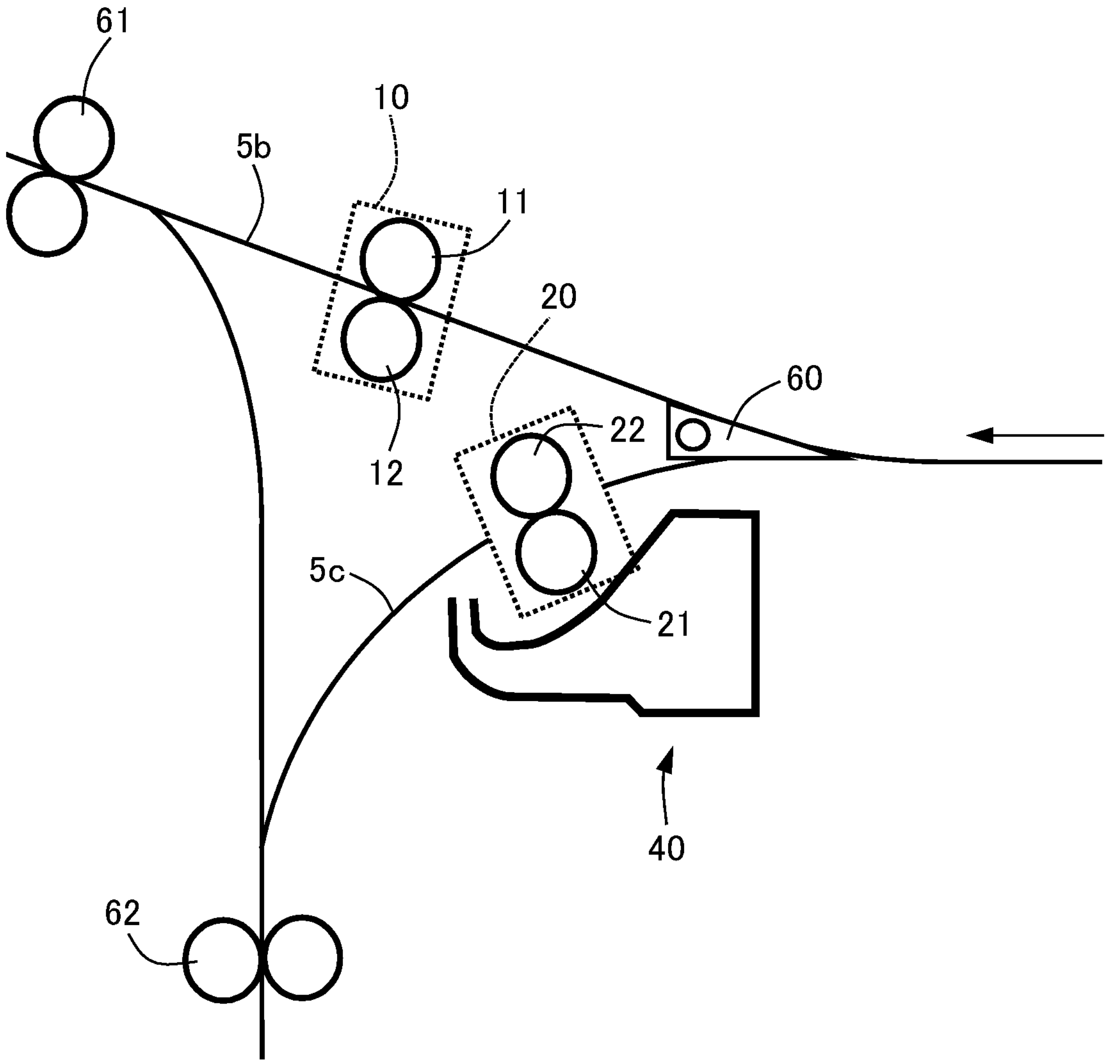
FIG. 2 is section view of cooling roller pairs and an air supply duct according to the first embodiment.

Next, the first cooling roller pair 10 and the second cooling roller pair 20 will be described with reference to FIG. 2. FIG. 2 is a schematic view of a reverse portion in the present embodiment. The first cooling roller pair 10 is disposed in the discharge path 5*b*, and includes a first driving roller 11 rotated by an unillustrated drive source, and a first driven roller 12 that rotates in accordance with the first driving roller 11. The second cooling roller pair 20 is disposed in the reverse path 5*c*, and includes a second driving roller 21 serving as a first roller rotated by an unillustrated drive source, and a second driven roller 22 serving as a second roller that rotates in accordance with the second driving roller 21. That is, the second cooling roller pair 20 is an example of a roller pair including the second driving roller 21 and the second driven roller 22 that nip and cool the sheet S conveyed in the reverse path 5*c*.

Here, in the case where the sheet S has a part that the second cooling roller pair 20 touches and a part that the second cooling roller pair 20 does not touch, glossiness unevenness is likely to occur due to the difference therebetween. Therefore, a wide nipped roller having a nip width approximately equal to the full length thereof in a width direction W (see FIG. 3) orthogonal to the conveyance direction of the sheet S is used as the second driving roller 21 and the second driven roller 22. In addition, in the present embodiment, a wide nipped roller extending to the entirety of the conveyance path in the width direction W is used as each of the first driving roller 11, the first driven roller 12, the second driving roller 21, and the second driven roller 22.

Air Blowing Unit

Figure 3:
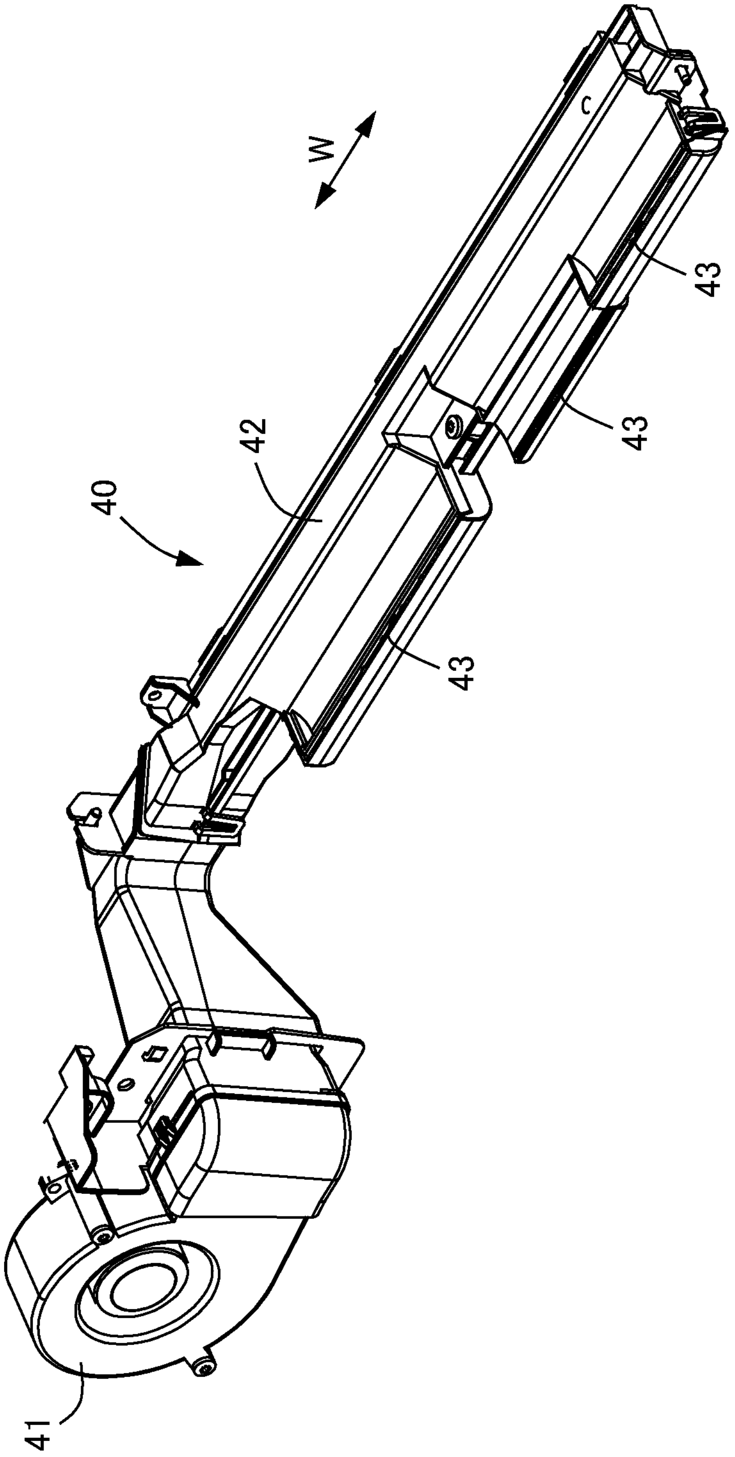
FIG. 3 is a perspective view of an air blowing unit according to the first embodiment.
Figure 4:
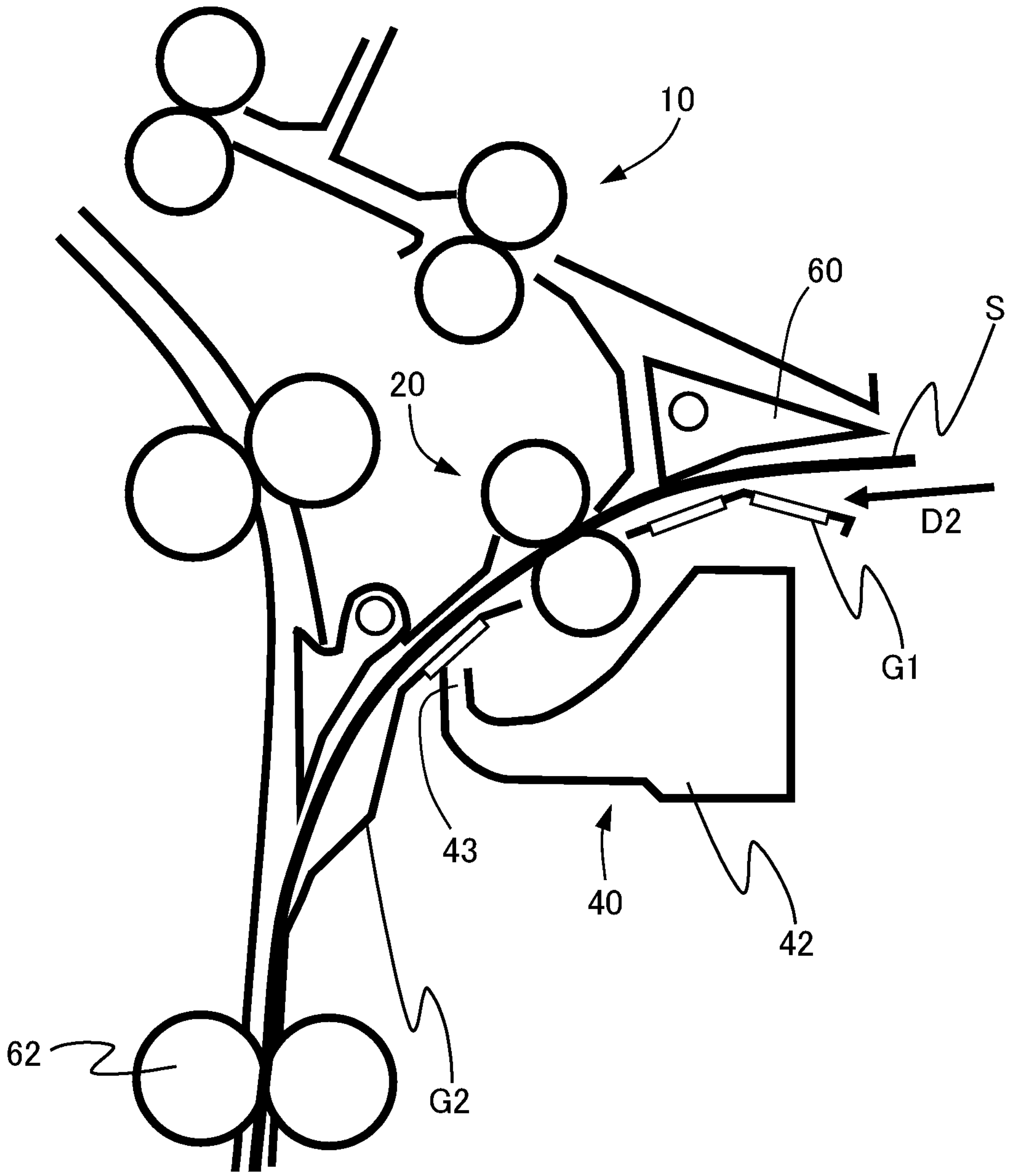
FIG. 4 is a section view of a second cooling roller pair and the air supply duct according to the first embodiment.

Next, the configuration of the air blowing unit 40 will be described with reference to FIGS. 3 to 5. FIG. 3 is a detailed diagram of the air blowing unit according to the present embodiment. The second cooling roller pair 20 having cooled the sheet S accumulates heat and the temperature thereof rises, and therefore in the present embodiment, the air blowing unit 40 is used for cooling the second driving roller 21 to dissipate the heat thereof.

The air blowing unit 40 includes an air blowing fan 41 and an air supply duct 42, and the air supply duct 42 has an air outlet port 43. The air blowing fan 41 sucks air in from the outside of the apparatus, and air discharged from the air blowing fan 41 is guided by the air supply duct 42 and is blown out from the air outlet port 43. That is, the air outlet port 43 is an example of an opening portion for blowing out air inside the air supply duct 42. In the present embodiment, the air outlet port 43 is divided into three in the width direction W to avoid interference with other members such as sensors, and the total width of the three parts of the air outlet port 43 is approximately equal to the full width in the width direction W of the sheet S. That is, the air supply duct 42 is provided to extend in the width direction W orthogonal to the sheet conveyance direction and allow air to pass therethrough, and thus supplies air outside the apparatus into the apparatus. However, the configuration is not limited to this, and the air outlet port 43 may have a shape that is not divided in the width direction W as long as the air outlet port 43 does not interfere with other members.

Figure 5:
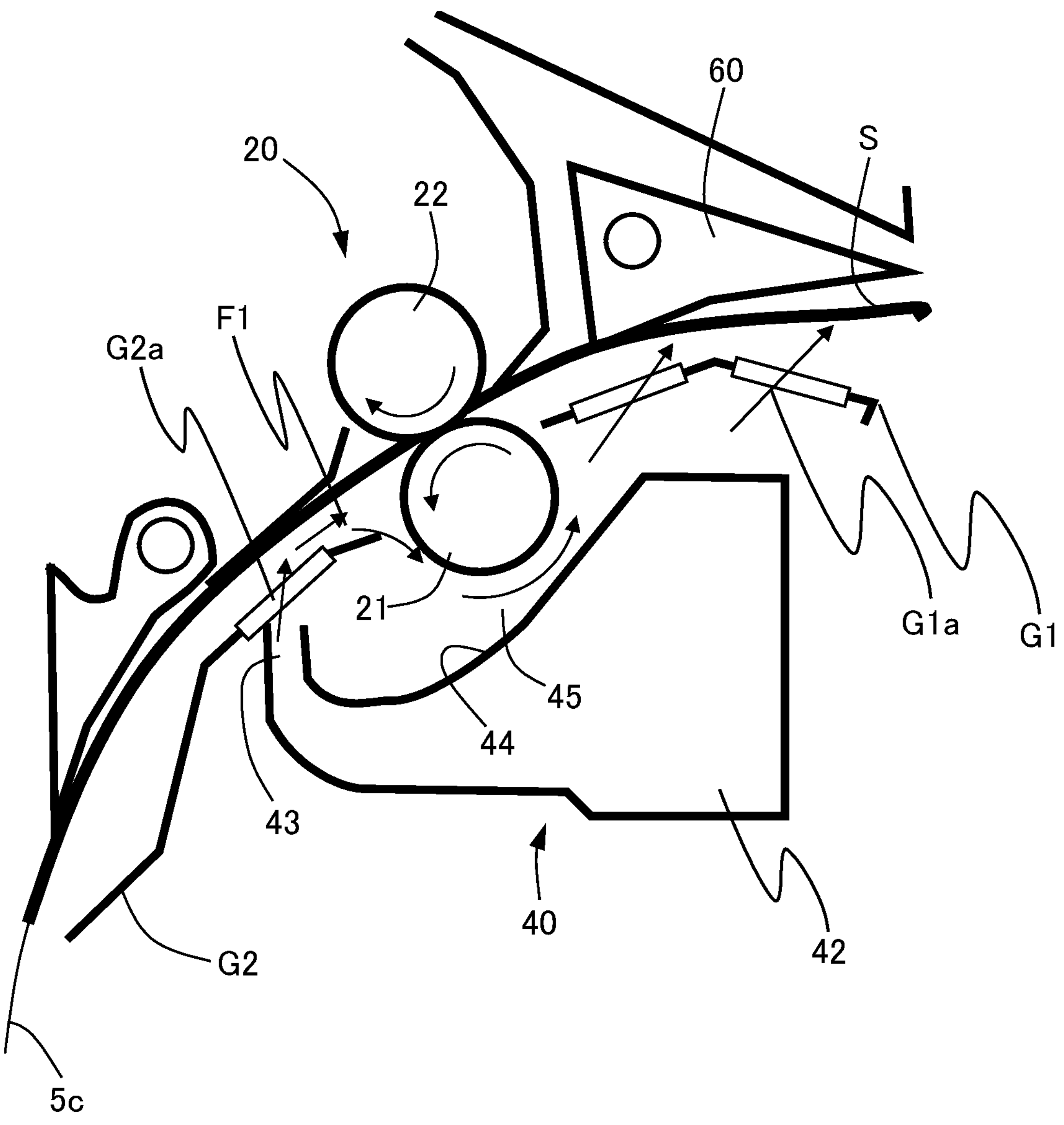
FIG. 5 is a section view illustrating a flow of air around the second cooling roller pair and the air supply duct according to the first embodiment.

As illustrated in FIG. 5, the air supply duct 42 is formed of resin, and has the air outlet port 43 facing the reverse path 5*c* and a side wall 44 facing the reverse path 5*c*. The side wall 44 is an example of a ventilation path forming portion that forms a ventilation path 45 between the side wall 44 and the second driving roller 21 and that is disposed to face the side of the second cooling roller pair 20 opposite to the nip of the second cooling roller pair 20 across the center line of the second driving roller 21. The ventilation path 45 mentioned herein is a ventilation path that communicates with the air outlet port 43 and in which air flows between the side wall 44 and the second driving roller 21.

Layout of Air Blowing Unit and Second Cooling Roller Pair

Here, the layout of the air blowing unit 40 and the second cooling roller pair 20 will be described with reference of FIG. 4. FIG. 4 is a schematic view of the reverse portion while the sheet S is conveyed. The air supply duct 42 of the air blowing unit 40 is disposed under the second cooling roller pair 20. The sheet S is conveyed in the direction of an arrow D2 serving as the sheet conveyance direction by the second cooling roller pair 20 and a conveyance roller pair 62. The sheet S is cooled by the air blowing unit 40 while passing through a space between the second cooling roller pair 20 and the conveyance roller pair 62.

Flow of Cooling Air

Next, the flow of a cooling air in the vicinity of the second cooling roller pair 20 will be described with reference to FIGS. 5 and 6. FIG. 5 is a detailed diagram of the flow of a cooling air between the second cooling roller pair 20 and the air blowing unit 40. The sheet S sent to the reverse path 5*c* passing through the second cooling roller pair 20 by the switching portion 60 passes between the switching portion 60 and a conveyance guide G1, is conveyed by the second cooling roller pair 20, and is sent to the conveyance roller pair 62 illustrated in FIG. 4. A conveyance guide G2 downstream of the second cooling roller pair 20 is provided with opening portions G2*a*, and the air outlet port 43 of the air blowing unit 40 is disposed in the vicinity of the opening portions G2*a*.

The cooling air blown out from the air outlet port 43 is diagonally blown in a direction approximately opposite to the conveyance direction of the sheet S. Then, the cooling air flows in a direction opposite to the conveyance direction of the sheet S. By hitting the sheet S by the cooling air in a direction opposite to the conveyance direction, the wind speed of the cooling air flowing on the surface of the sheet S is (wind speed of cooling air+conveyance speed of sheet S) as viewed from the surface of the sheet S, which is higher than a wind speed in the case of blowing the cooling air in the same direction as the conveyance direction. As a result of this, the sheet S can be more efficiently cooled than in the case of blowing the cooling air in the same direction as the conveyance direction, and the wind speed increases as the conveyance speed increases, which suppresses deterioration of the cooling performance caused by increase in the conveyance speed.

The cooling air having flowed on the surface of the sheet S then hits the second cooling roller pair 20. Since the second cooling roller pair 20 is a roller pair having a nip width approximately equal to the full length thereof in the width direction W, the wind is blocked by the sheet S and the second cooling roller pair 20 and does not pass through. Therefore, the cooling air blows to the outside of the conveyance guide G2 through a gap between the conveyance guide G2 and the second driving roller 21 as indicated by an arrow F1.

Then, the cooling air flows along the outer peripheral portion of the second driving roller 21, and blows out to a space between the second driving roller 21 and the air supply duct 42 along the outer shape of the air supply duct 42. As a result of this, the cooling air flows along the outer periphery of the second driving roller 21, thus the time in which the cooling air is in contact with the second driving roller 21 is long, and thus the second driving roller 21 can be efficiently cooled. Then, the cooling air passes through the conveyance guide G1 through opening portions Gla provided in the conveyance guide G1, and cools the sheet S again.

That is, the air outlet port 43 is disposed downstream of the second driving roller 21 in the sheet conveyance direction to blow out air toward the upstream side, and thus the sheet S conveyed by the second cooling roller pair 20 is cooled. In addition, a ventilation path 45 formed by the second driving roller 21 and the air supply duct 42 ventilates such that the air having been blown out from the air outlet port 43 and having cooled the sheet S reaches a position upstream of the second driving roller 21 while cooling the second driving roller 21.

Here, the air flowing in the air supply duct 42 reaches a temperature close to that of the outside air, and the cooling air flowing outside the air supply duct 42 and flowing in the vicinity of the second cooling roller pair 20 includes heat and moisture emitted from the sheet S, and is thus hotter and more humid than the outside air. At this time, the inner surface of the air supply duct 42 is likely to be hotter than the cooling air, and therefore the temperature of the cooling air having touched the surface of the duct is likely to increase. In addition, on the surface of the side wall 44 of the air supply duct 42, there is a possibility that the hot and humid air is cooled to cause condensation. To address this, in the present embodiment, the air supply duct 42 is formed of resin. Since resin has a heat insulating property, occurrence of such a problem can be avoided.

Figure 6:
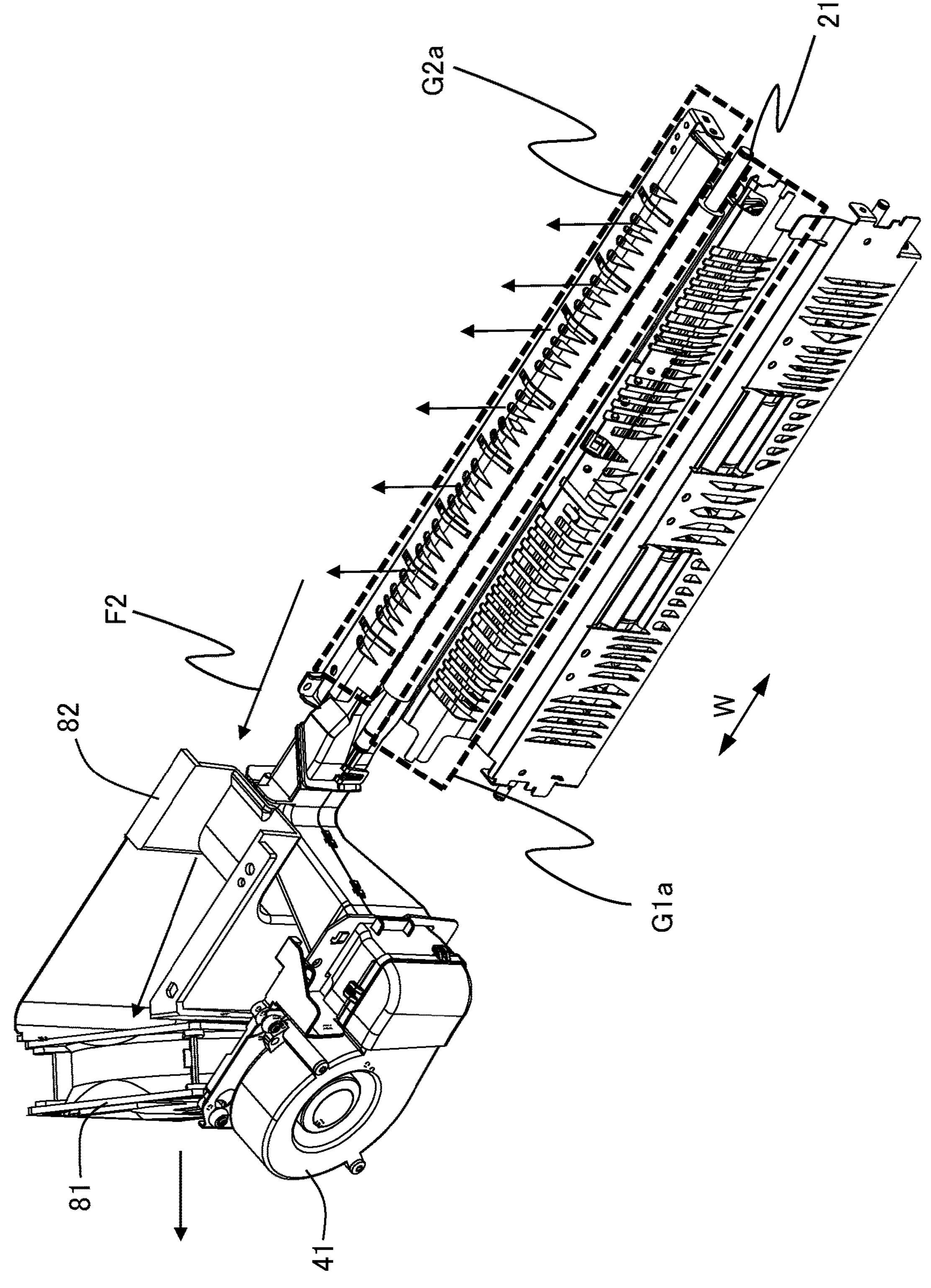
FIG. 6 is a perspective view of an air blowing unit and an exhaustion duct according to the first embodiment.

FIG. 6 is a detailed diagram illustrating the flow of the cooling air after cooling the sheet S. As illustrated in FIG. 6, the opening portions G1*a* and G2*a* are holes provided in the conveyance guides G1 and G2, and a plurality of each are present in the width direction W orthogonal to the conveyance direction. The cooling air having cooled the sheet S on the upstream side of the second cooling roller pair 20 is blown out upward from the opening portions G2*a*, is then sucked in the arrow F2 direction by an exhaustion fan 81, and is exhausted to the outside of the apparatus via an exhaustion duct 82 and the exhaustion fan 81. That is, the exhaustion duct 82 is disposed upstream of the second driving roller 21 in the sheet conveyance direction, and sucks and exhausts the air having passed through the ventilation path 45.

As described above, according to the image forming apparatus 1 of the present embodiment, the air supply duct 42 includes the air outlet port 43 facing the reverse path 5*c*, and the side wall 44 serving as a ventilation path forming portion. As a result of this, the cooling performance can be improved by combining cooling by contact with the second cooling roller pair 20 and cooling without contact by blowing air from the air supply duct 42. Further, in addition to this, by cooling the sheet S by blowing air from the air blowing unit 40 and efficiently cooling the second cooling roller pair 20 at the same time by using the side wall 44 serving as the outer shape of the air supply duct 42, the influence of deterioration of the cooling effect corresponding to the conveyance speed can be suppressed. Therefore, the cooling performance of the sheet S after fixation can be improved.

Here, in a method of cooling by blowing air using a fan and a duct, there is a problem that in the case where the conveyance speed of the sheet increases, the time for the sheet to pass through the space for cooling becomes shorter, and the cooling performance is likely to deteriorate. In contrast, according to the image forming apparatus 1 of the present embodiment, the one air blowing unit 40 cools the sheet itself, and also improves the cooling performance of the second cooling roller pair 20 to not cause an image defect caused by the sheet temperature.

In addition, according to the image forming apparatus 1 of the present embodiment, since the entirety of the air supply duct 42 is formed of resin, the heat insulating property of the duct can be secured. Therefore, a situation in which air of a low temperature in the air supply duct 42 is heated or condensation occurs on the surface of the air supply duct 42 can be suppressed.

In addition, according to the image forming apparatus 1 of the present embodiment, the air blowing unit 40 is provided so as to cool the second cooling roller pair 20 provided in the reverse path 5*c*. Therefore, in the reverse path 5*c* which is curved more than the discharge path 5*b* and in which the sheet S is more likely to come into contact with the guide to cause deterioration of the image quality, the deterioration of the image quality can be efficiently suppressed by cooling the second cooling roller pair 20.

Second Embodiment

Next, a second embodiment of the present invention will be described in detail with reference to FIG. 7. In the present embodiment, the configuration is different from the first embodiment in that the side wall 44 of the air supply duct 42 is provided with a heat insulating material 46. To be noted, the other elements are substantially the same as in the first embodiment, and therefore are denoted by the same reference signs, and detailed description thereof will be omitted.

As described in the first embodiment, the air flowing in the air supply duct 42 has a temperature close to that of the outside air, and the cooling air flowing outside the air supply duct 42 and in the vicinity of the second cooling roller pair 20 includes heat and moisture emitted from the sheet S, and is thus hotter and more humid than the outside air. At this time, the inner surface of the air supply duct 42 is likely to have a temperature higher than that of the cooling air, and therefore the temperature of the cooling air having touched the surface of the duct is likely to increase. In addition, there is a possibility that, on the surface of the side wall 44 of the air supply duct 42, the hot and humid air is cooled to cause condensation.

Figure 7:
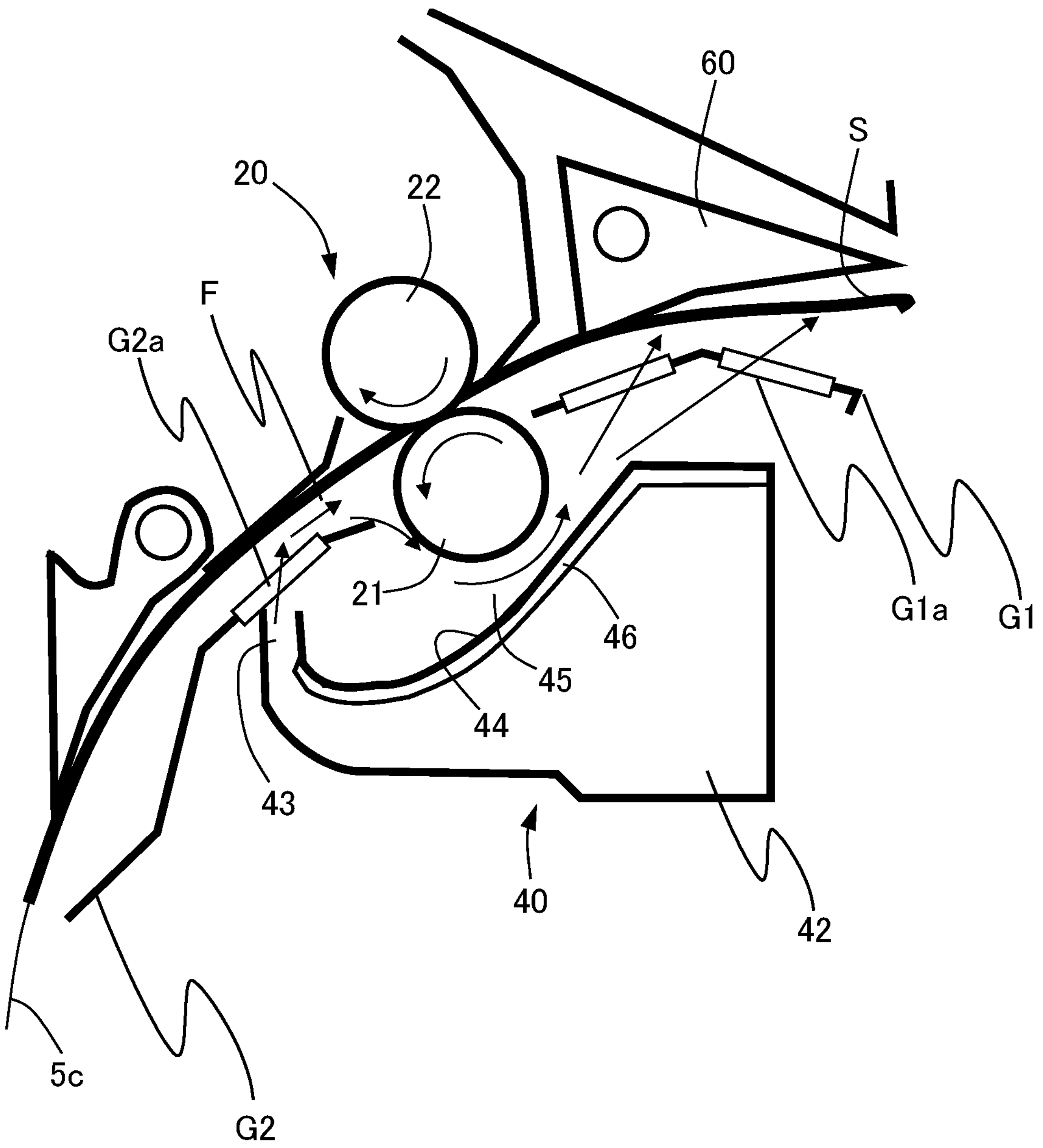
FIG. 7 is a section view illustrating a flow of air around a second cooling roller pair and an air supply duct according to a second embodiment.

In contrast, in the present embodiment, as illustrated in FIG. 7, the heat insulating material 46 is stuck to the side wall 44 of the air supply duct 42 by adhesion or the like. The temperature rise is suppressed by sticking the heat insulating material 46 to the surface of the side wall 44 of the air supply duct 42. For example, the heat insulating material 46 is preferably constituted by a foam material or an unwoven fabric. As a result of this, heating of the air in the air supply duct 42 and occurrence of condensation can be suppressed. In the present embodiment, since the heat insulating material 46 is stuck to the inner surface of the side wall 44, the width of the ventilation path 45 can be secured. However, a similar effect can be also obtained by sticking the heat insulating material 46 to the outer surface of the side wall 44.

To be noted, although the entirety of the air supply duct 42 is formed of resin in each of the embodiments described above, the configuration is not limited to this. For example, the air supply duct 42 may be constituted by a duct body and a side wall including a ventilation forming portion and formed of a material having a higher heat insulating property than the duct body. In this case, for example, the side wall may be formed of resin, and the duct body may be formed of metal.

In addition, although a case where the cooling air blown out from the air outlet port 43 is blown in a direction opposite to the conveyance direction of the sheet S has been described in each of the embodiments described above, the configuration is not limited to this, and for example, the cooling air may be blown in the same direction as the conveyance direction of the sheet S. In this case, the air outlet port 43 is disposed upstream of the second driving roller 21 in the sheet conveyance direction to blow out air toward the downstream side, and thus the sheet S conveyed by the second cooling roller pair 20 is cooled. In addition, the ventilation path 45 formed by the second driving roller 21 and the air supply duct 42 ventilates such that the air having been blown out from the air outlet port 43 and having cooled the sheet S reaches a position downstream of the second driving roller 21 while cooling the second driving roller 21.

In addition, although the air blowing unit 40 is provided so as to cool the second cooling roller pair 20 provided in the reverse path 5*c*, the configuration is not limited to this. For example, an air blowing unit may be provided so as to cool the first cooling roller pair 10 provided in the discharge path 5*b*.

In addition, although a case where a duct including a ventilation path forming portion is used as the air supply duct 42 has been described in each of the embodiments described above, the configuration is not limited to this. For example, an exhaustion duct including a ventilation path forming portion may be disposed to face the second driving roller 21 such that after the sheet is cooled by an air blown out from a different air supply duct, the second driving roller 21 is cooled between the exhaustion duct and the sheet and the air is exhausted to the outside through an exhaustion port that is an opening portion of the exhaustion duct.

According to the present invention, the cooling performance of the sheet after fixation can be improved.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-107600, filed Jul. 4, 2022 which is hereby incorporated by reference herein in its entirety

What is claimed is:

1. An image forming apparatus comprising:

a fixing portion configured to heat a toner image transferred onto a sheet and fix the toner image to the sheet;

a conveyance path through which a sheet is conveyable from the fixing portion;

a conveyance roller pair disposed in the conveyance path and including a first roller and a second roller, the first roller and the second roller being configured to nip and convey the sheet conveyed in the conveyance path; and a duct extending in a width direction, which is orthogonal to a sheet conveyance direction, and configured to allow air to pass therethrough for supplying air outside the image forming apparatus into the image forming apparatus, wherein the duct includes:

an air outlet port for blowing out air inside the duct, the air outlet port being disposed on a same side of the first roller with respect to the conveyance path, wherein the air outlet port is disposed downstream of the first roller in the sheet conveyance direction and is configured to blow air into the conveyance path toward an upstream side in the sheet conveyance direction for blowing air to a sheet conveyed by the conveyance roller pair; and a ventilation path forming portion disposed on a side opposite to a nip of the conveyance roller pair across a center line of the first roller and forming a ventilation path configured to allow air to pass therethrough between the first roller and the ventilation path forming portion, wherein the ventilation path is configured to allow air to pass therethrough so that the air having been blown out from the air outlet port and having been blown to the sheet passes from downstream to upstream of the first roller in the sheet conveyance direction.

2. The image forming apparatus according to claim 1, wherein the ventilation path forming portion is a side wall of the duct facing the conveyance path.

3. The image forming apparatus according to claim 1, wherein the duct is formed of resin.

4. The image forming apparatus according to claim 1, further comprising an exhaustion duct disposed upstream of the first roller in the sheet conveyance direction and configured to suck air having passed the ventilation path thereinto and exhaust the sucked-in air.

5. The image forming apparatus according to claim 1, further comprising:

another conveyance path through which the sheet is conveyable from the fixing portion, wherein the conveyance path is curved more than the another conveyance path.

6. The image forming apparatus according to claim 5, further comprising:

a reverse portion configured to reverse and convey a sheet conveyed in a first direction to a second direction opposite to the first direction, wherein the another conveyance path is a discharge path disposed downstream of the fixing portion in the sheet conveyance direction and through which a sheet conveyed from the fixing portion is dischargeable to outside of the image forming apparatus, and wherein the conveyance path is a reverse path provided to branch from the discharge path and through which the sheet conveyed from the fixing portion is conveyable to the reverse portion.

7. The image forming apparatus according to claim 1, wherein:

the side wall is formed of resin, and the conveyance path includes:

a first conveyance guide disposed on the same side of the first roller with respect to the nip of the conveyance roller pair and configured to guide a sheet on a downstream side of the conveyance roller pair in the sheet conveyance direction, wherein the first conveyance guide includes a first opening portion disposed upstream of the first roller in the sheet conveyance direction and through which the air having cooled the first roller in the ventilation path is blown out to the conveyance path; and a second conveyance guide disposed on the same side with the first roller with respect to the nip of the conveyance roller pair and configured to guide a sheet on a upstream side of the conveyance roller pair in the sheet conveyance direction, wherein the second conveyance guide includes a second opening portion through which air blown from the air outlet port flows into the conveyance path and forms a gap between the first roller so that the air having blown into the conveyance path and having cooled a sheet flows into the ventilation path through the gap.

8. An image forming apparatus comprising:

a fixing portion configured to heat a toner image transferred onto a sheet and fix the toner image to the sheet;

a conveyance path through which a sheet is conveyable from the fixing portion;

a roller pair disposed in the conveyance path and including a first roller and a second roller, the first roller and the second roller being configured to nip the sheet conveyed in the conveyance path to cool the sheet;

a duct extending in a width direction, which is orthogonal to a sheet conveyance direction, and configured to allow air to pass therethrough, wherein the duct includes:

a ventilation path forming portion disposed on a side opposite to a nip of the roller pair across a center line of the first roller and forming a ventilation path configured to allow air to pass therethrough between the first roller and the ventilation path forming portion; and an opening portion continuous with the ventilation path forming portion and facing the conveyance path; and a heat insulating material attached to the ventilation path forming portion.

9. An image forming apparatus, comprising:

a fixing portion configured to heat a toner image transferred onto a sheet and fix the toner image to the sheet;

a conveyance path through which a sheet is conveyable from the fixing portion;

a roller pair disposed in the conveyance path and including a first roller and a second roller, the first roller and the second roller being configured to nip the sheet conveyed in the conveyance path to cool the sheet;

a duct extending in a width direction, which is orthogonal to a sheet conveyance direction, and configured to allow air to pass therethrough, wherein the duct includes:

a duct body; and a side wall formed of a material having a higher heat insulating property than the duct body, and including a ventilation path forming portion disposed on a side opposite to a nip of the roller pair across a center line of the first roller and forming a ventilation path configured to allow air to pass therethrough between the first roller and the ventilation path forming portion, wherein the duct body includes an opening portion continuous with the ventilation path forming portion and facing the conveyance path.

10. The image forming apparatus according to claim 9, wherein the side wall is formed of resin.

* * * * *